United States Patent [19]
Dutkiewicz

[11] Patent Number: 5,845,216
[45] Date of Patent: Dec. 1, 1998

[54] OPTIMIZED COMPANDING FOR COMMUNICATION OVER CELLULAR SYSTEMS

[75] Inventor: Marek Karol Dutkiewicz, Delta, Canada

[73] Assignee: Sierra Wireless, Inc., Canada

[21] Appl. No.: 454,041

[22] Filed: May 30, 1995

[51] Int. Cl.⁶ .............................. H04B 1/38; H04M 1/00
[52] U.S. Cl. ........................ 455/557; 455/422; 455/72; 455/556; 375/222
[58] Field of Search ............................ 455/72, 33.1, 54.1, 455/43, 422, 517, 425, 575, 557, 556; 375/222; 379/58, 59, 60; 381/106; 333/14

[56] References Cited

U.S. PATENT DOCUMENTS

| | | | |
|---|---|---|---|
| 4,215,431 | 7/1980 | Nady | 455/43 |
| 4,250,470 | 2/1981 | Szarvas | 455/72 |
| 4,741,018 | 4/1988 | Potratz et al. | 381/106 |
| 4,953,197 | 8/1990 | Kaewell, Jr. et al. | 379/58 |
| 5,212,808 | 5/1993 | Su et al. | 379/60 |
| 5,386,590 | 1/1995 | Dolan | 455/33.1 |
| 5,422,816 | 6/1995 | Sprague et al. | 455/89 |
| 5,513,183 | 4/1996 | Kay et al. | 455/33.1 |
| 5,519,767 | 5/1996 | O'Horo et al. | 379/67 |
| 5,627,835 | 5/1997 | Witter | 370/320 |

*Primary Examiner*—Nguyen Vo
*Attorney, Agent, or Firm*—Burns, Doane, Swecker & Mathis LLP

[57] ABSTRACT

An integrated cellular switched modem for enhanced cellular data communication by implementing in DSP or Software all baseband processing normally carried out in a cellular radio transceiver within the processor of the single integrated wireless modem. Adjustments are made to EIA/TIA standards for pre-emphasis, de-emphasis, and companding functions implemented by DSP in order to optimize communication for data.

6 Claims, 7 Drawing Sheets

OPTIMIZED COMPANDING FOR COMMUNICATION OVER CELLULAR SYSTEMS

BACKGROUND OF THE INVENTION

The present invention relates to radio communication systems and, more particularly, to an apparatus and method for improving data communication within cellular communication devices, such as Base Station Equipment, for use with "Modem pools" and cellular modem products.

Radio communication systems have become prevalent on all levels of society due to their inherent flexibility to provide communications where wire lined systems cannot.

One of the biggest limitations in the use of modems over cellular radio channels results from distortions caused by the baseband processing that is applied by both the transmitting and receiving modem. Normally cellular phones have built-in compensating functions which are needed to enhance voice communications. However, when a cellular phone is connected with a baseband modem, such as a direct access modem from AT&T, these same built-in functions severely degrade data communications.

A number of techniques have been developed in an attempt to overcome these distortions. One technique utilized to overcome this difficulty is to pre-compensate the data sent from the modem to the cellular phone in the opposite manner of the distortions that will be introduced by the cellular phone. An implementation of this "inverse compensation" is exhibited by U.S. Pat. No. 5,386,590 to Dolan, which attempts to eliminate distortion caused by clipping or sluggish recovery time induced by a limiter circuit existing in conventional cellular communication systems. In one embodiment, pre-emphasis and de-emphasis functions of the cellular system are offset by complementary de-emphasis and post emphasis circuits so that high frequency components of the data signal are not clipped by the limiter.

A problem with the prior systems is that they introduce an extra step of processing of the data which can lead to data degradation or loss.

Another problem with the prior systems is that normally all of the baseband processing stages are carried out in the cellular radio transceiver. This typically requires a large number of parts in the cellular modem, for instance, in the Philips reference cellular radio design (see *RF/Wireless Communications Handbook* 1993, North American Philips Corporation, pp. 851–883), there are two integrated circuits (ICs) and 10–20 discrete parts, all of which are necessary to perform this function.

A third problem is that these systems are not flexible and difficulties can be encountered when trying to connect with different network configurations.

It is an object of this invention to obviate the need for undesirable pieces of the baseband processing, such as pre-emphasis of the modem transmitted signal, resulting in faster and more reliable data communications, while significantly lowering the cost and size of the required device.

It is another object of this invention to provide a system that is highly compatible with different network configurations providing optimal data communication for each network.

SUMMARY

In order to achieve the above objects, according to the present invention, all of the baseband processing stages normally carried out in a cellular radio transceiver are implemented as part of a Digital Signal Processing (DSP)-based modem. By designing an integrated cellular switched modem, performance is enhanced over traditional systems implemented using separate baseband modems and cellular phones. Normal cellular phones have within them companding, pre-emphasis, and de-emphasis functions which accommodate voice communication. These functions are far from ideal for data and previous solutions have tried to allow for these functions by various compensating techniques in the baseband modem. In the present invention, the radio and baseband modem have been designed as one unit to improve end to end communication. The result of this configuration is that end to end companding, pre-emphasis, and similar functions are optimized for data transmission and reception. All baseband processing may be implemented by one processor using DSP or software, in which all functions are carried out with precise algorithms. This allows for optimum performance in an integrated modem. By implementing these algorithms in DSP, various software system solutions can be flexibly devised which are also optimized for different cellular network configurations, including those where complementary optimized processing functions are provided at the base station.

BRIEF DESCRIPTION OF THE DRAWINGS

FIG. 2-1 shows a block diagram of an expandor;

FIG. 2-2 shows a block diagram of a compressor;

FIG. 2-3 shows a block diagram of an alternative embodiment compressor with feedback;

FIG. 3-1 shows a test signal(12 db step) specified by CCITT 162;

FIG. 3-2 illustrates compressor output utilizing a DSP algorithm; and

FIG. 4-1 shows when the input signal is perfectly replicated by the output of an expandor; and FIG. 4-2 shows output when a compressor/expandor pair is not perfectly matched.

DETAILED DESCRIPTION OF THE PREFERRED EMBODIMENTS

The present invention combines the baseband modem and cellular phone of prior systems into an integrated cellular switched modem, allowing enhanced performance. The Electronic Industry Association/Telecommunication Industry Association (EIA/TIA) 553 specification, describes the baseband processing stages of the compressor (§2.1.3.1.1), pre-emphasis (§2.1.3.1.2), deviation limiter (§2.1.3.1.3), post deviation-limiter filter (§2.1.3.1.4), de-emphasis (§2.1.3.1.4), and Expandor (§2.2.2.1.2). These processing stages preferably are implemented in the present invention by a DSP that is carrying out the V.32bis or V.34 modem data-pump processing. Experimentally, it was found that optimal modem performance is achieved by adjusting some of the baseband processing stages. This adjustment is necessary since the EIA/TIA specification was originally written assuming the use of voice signals. In contrast, modem signals in data communications are characterized by a higher mean baseband power, and a relatively constant mean power. As a result, in the present invention, the following stages are adjusted from the EIA/TIA recommendations. Typically, a modem signal has flat-frequency spectrum across the band. Applying the level of pre-emphasis specified in EIA/TIA standards requires either a very low deviation setting, or else distortion due to deviation limiting can occur. Accordingly, in the present invention a reduced level of pre-emphasis is used when the modem is transmitting data. With this implementation, the problems resulting from deviation limiting are avoided. In addition, a modem has adaptive filtering when receiving. This filtering automatically adjusts for the pre-emphasis applied by the base station. Thus, according to this invention, no extra de-emphasis filtering is applied beyond that achieved by the adaptive filtering. Furthermore, using the DSP for the expandor and compression portion allows a more accurate implementation than achieved by a typical (e.g. Philips NE578) hardware based solution.

In radio communication systems, companding is employed to reduce the dynamic range of the voice signal input to the radio. The process involves compressing the signal in the transmitter, and an equivalent expansion in the receiver. Through use of this process, a wider range of voice signal amplitudes is enabled to be transmitted across a 'noisy' RF channel. A similar technique is used in long distance telephone communication schemes. The reference recommendation is Recommendation G. 162 CCITT Plenary Assembly, Geneva, May–June 1984, Blue Book, Volume III, page 52, which is hereby incorporated by reference.

Figure 1A:
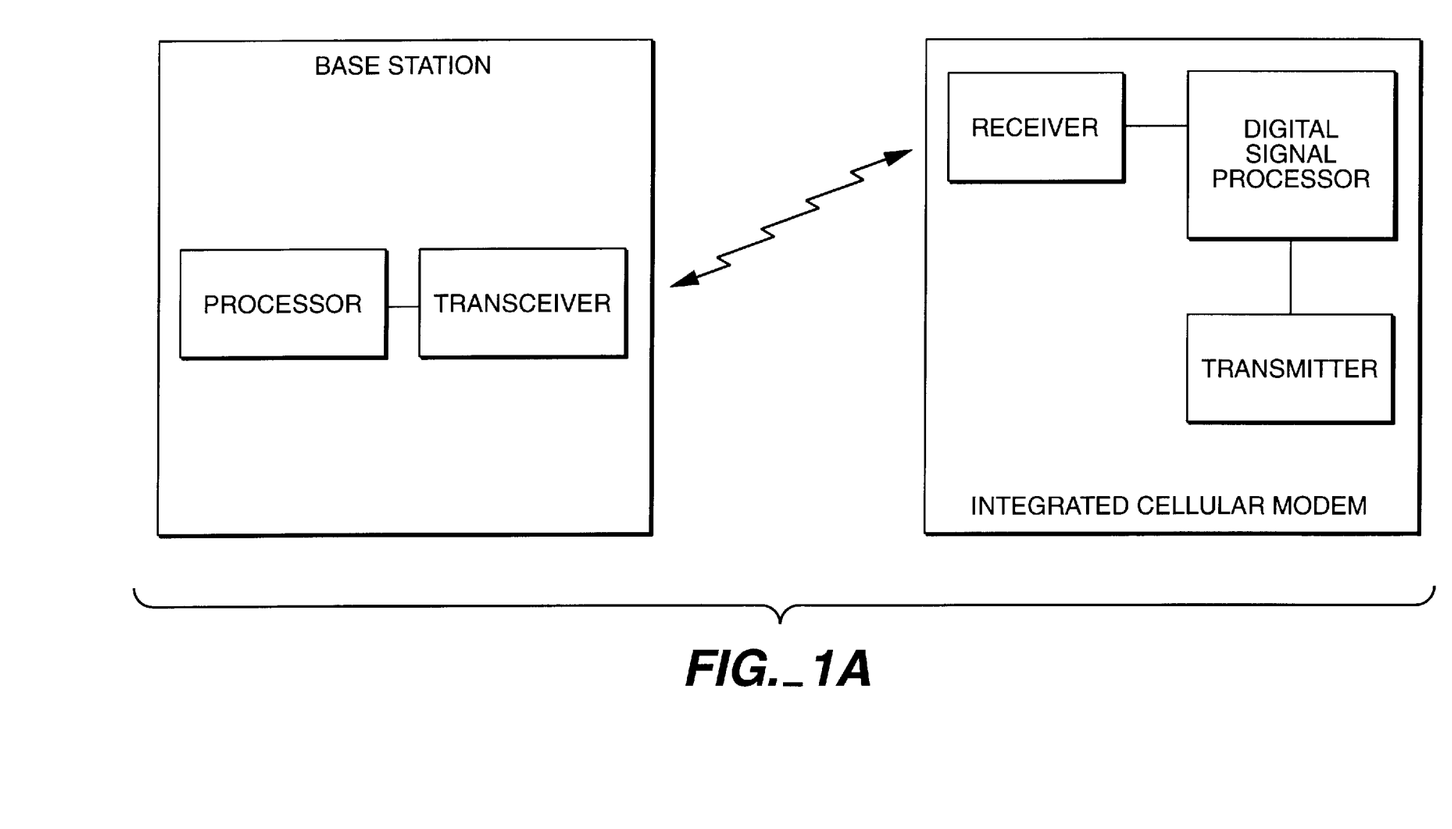
FIG. 1A shows a block diagram of an exemplary embodiment of a base station and integrated cellular modem.
Figure 1B:
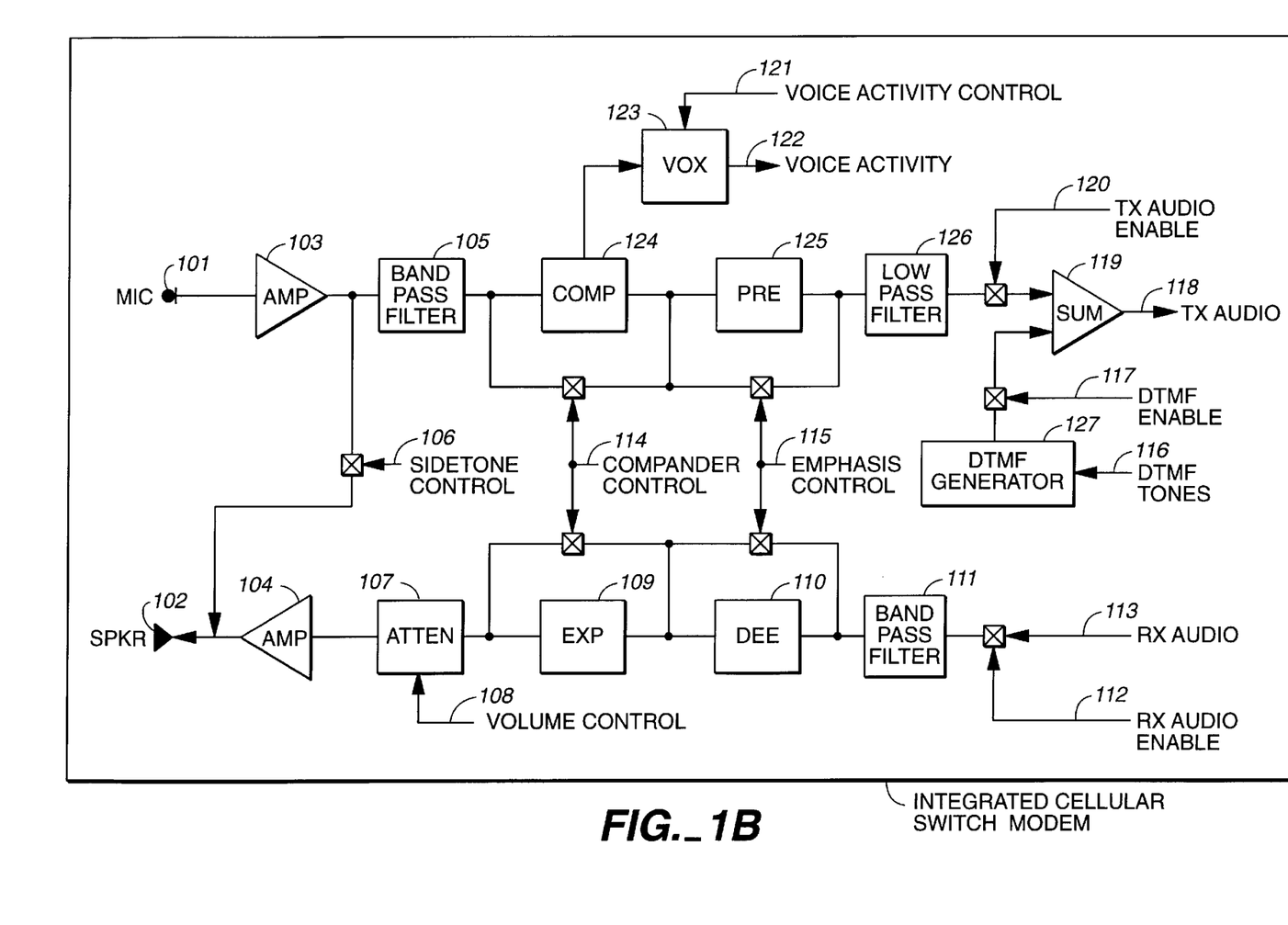
FIG. 1B shows a block diagram for audio controls.

Most cellular phones employ an analog IC, such as Philips NE5751, to perform the companding functions. FIG. 1 shows an audio controller block diagram for use in such a system. The compandor control 114 allows the audio compressor 124 and expandor 109 stages to be by-passed for audio acceptance testing. The compressor 124 and expandor 109 must be enabled during normal operation of a cellular telephone. The emphasis control 115 allows the audio pre-emphasis 125 and de-emphasis filter 110 stages to be by-passed for audio acceptance testing. The emphasis filters 125 and 110 must be enabled during normal operation of a cellular telephone. FIG. 1 serves to illustrate the basic status inputs and control outputs that are usually required in a cellular environment. The functional capabilities of the audio hardware are assumed to be similar to those implemented by the Philips NE 5750/NE5751 audio processor chip pair or equivalents. Stages 105, 126, 119, 127, 111 are standard steps in regular modem processing. Stage 125, although a standard stage found in normal modem processing, has been changed according to this invention from the EIA/TIA-553 standard to reduce emphasis of the high frequency signals. Stages 109 and 124 are added by this invention, and stage 110 is implemented as part of the adaptive equalization employed in the modem processing.

These same functions can be implemented by DSP or software. According to one embodiment of the present invention, the compressor and expandor implement the following companding function. At the compressor, every 2 dB change in signal power at the input produces a 1 dB change in the compressor output. The reverse operation is performed in the expandor.

The performance of the compandor is described by its attack and recovery time, as defined in CCITT Recommendation G.162 (noted above). In the present invention, a 12-dB step signal at a frequency of 2 kHz is applied at the input to the compressor. The time between the application of this step, and when the signal envelope reaches 1.5 times its steady state value is termed the Attack Time of the compressor. Similarly, when a 12-dB step signal at a frequency of 2 kHz is applied at the input to the compressor, the time between the application of this step, and when the signal envelope reaches 0.75 times its steady value, is termed the Recovery Time of the compressor. Similar definitions are used to characterize the expandor circuit.

Figure 21:
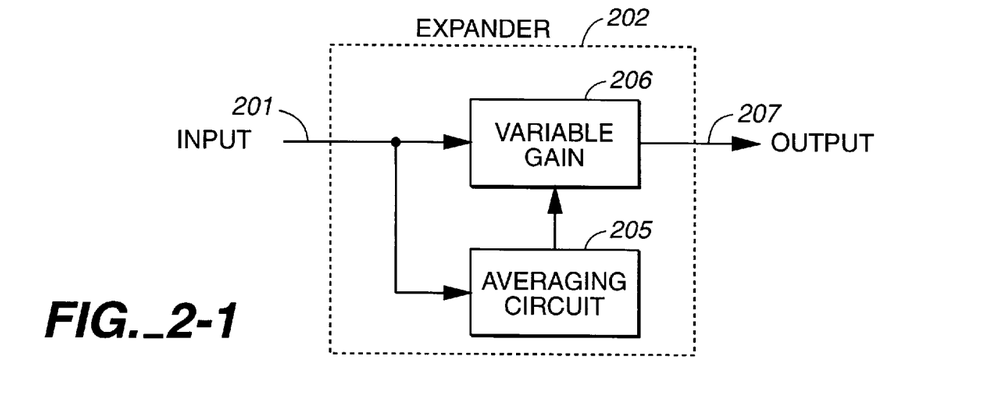

FIG. 2-1 shows a block diagram of an expandor contemplated by the present invention. A variable gain, proportional to the average input signal power is applied to the input signal. By defining the proportion such that an input signal of unity average signal power(magnitude 1) gives a gain of unity, then the output signal will have a signal power of 1. If the input signal increases such that the average signal power has magnitude 2, then the gain increases to 2, and the output signal power increases to 4. Converting to a decibel measurement system, using magnitude(dB)=10 $\log_{10}$ (magnitude), a 3 dB increase in input power gives a 6 dB increase in output power, satisfying the requirements of EIA/TIA-553. A DSP version of the expandor can be implemented by the following novel algorithm as follows:

(1) sig_out(n)=gain(n)*sig_in(n)

(2) sig_avg(n+1)=k*abs(sig_in(n))+(1−k)*sig_avg(n)

(3) gain(n+1)=sig_avg(n+1)/sig_ref . . . sig_ref where k is an averaging constant and sig-ref is the reference signal amplitude, sig_out is the output signal, sig_in is the input signal, abs is the absolute value, and sig_avg is the average signal.

The attack and recovery time of the circuit is adjusted by modifying the bandwidth of the averaging circuit. In the DSP algorithm this is achieved by modifying the value 'k' used in equation (2).

Figure 22:
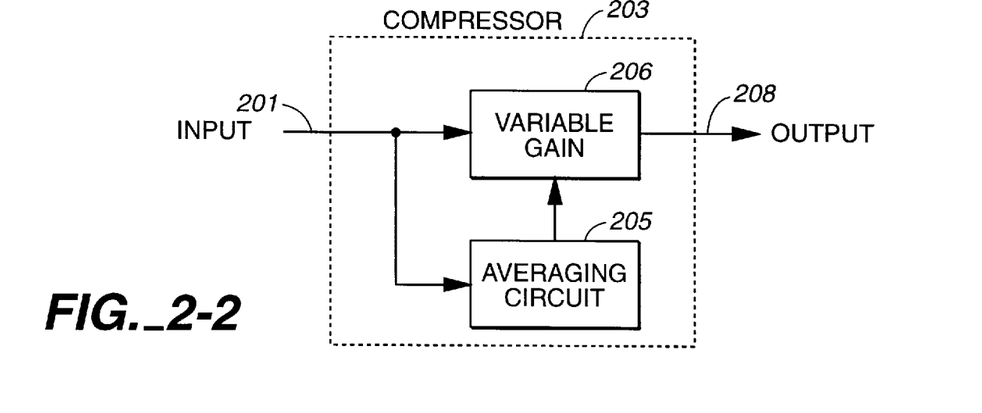
Figure 23:
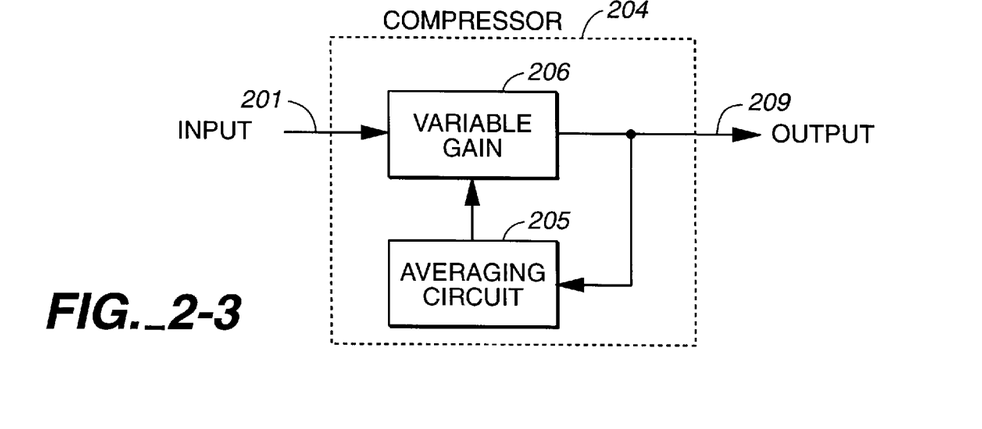

FIG. 2-2 shows a direct interpretation of the compressor specification. In this configuration, however, the gain would need to be related to the average signal (sig_avg) as follows: gain=10^(log(sig_avg)/sig-ref)/2); which involves a logarithmic and an exponential evaluation. The need for this can be obviated by using a feedback scheme as shown in FIG. 2-3.

A variable gain proportional to the inverse of the average output signal power is applied to the input signal. The operation of the circuit is best illustrated by considering the magnitude of the input signal. By defining the proportion such that an output signal of unity average power gives a gain of unity, then, working backwards, the input signal has unity power. Consider now that the output signal power has increased to a magnitude of 2. The gain is then the inverse of the magnitude (i.e.0.5), and thus the input signal power is 4. Converting to decibels, a 6 dB change in input signal power has given a 3 dB increase in output power, satisfying the requirements of EIA/TIA-553. This also may be implemented by a novel DSP algorithm as follows:

(4) sig_out(n)=sig_in(n)/gain(n)

(5) sig_avg(n+1)=k*abs(sig_out(n))+(1−k)*sig_avg(n)

(6) gain(n+1)=sig_avg(n+1)/sig_ref k is averaging constant and sig_ref is the reference signal amplitude.

The attack and recovery time of the circuit is adjusted by modifying the bandwidth of the averaging circuit. In the DSP algorithm this is achieved by modifying the value 'k' used in equation (5).

Figure 31:
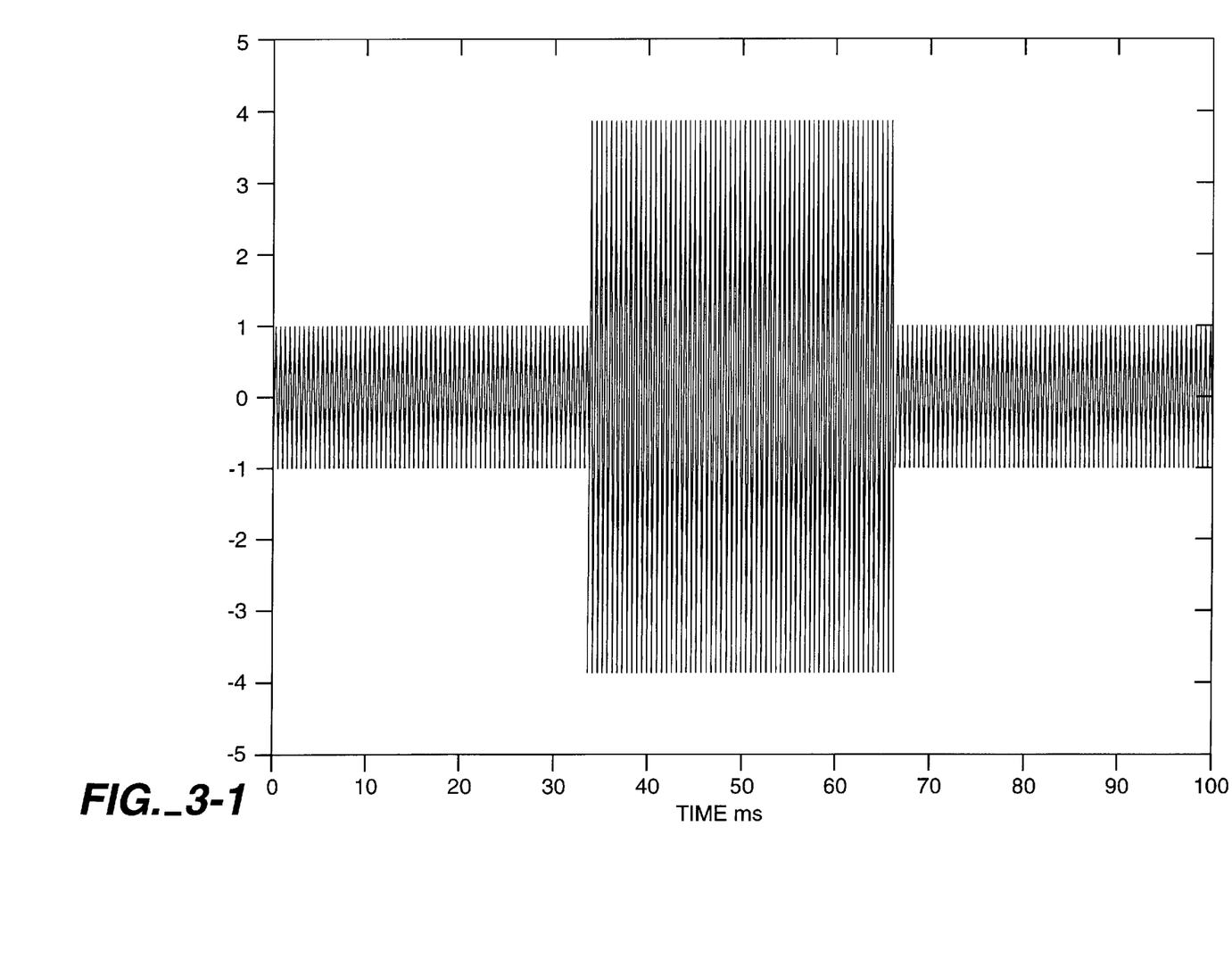
Figure 32:
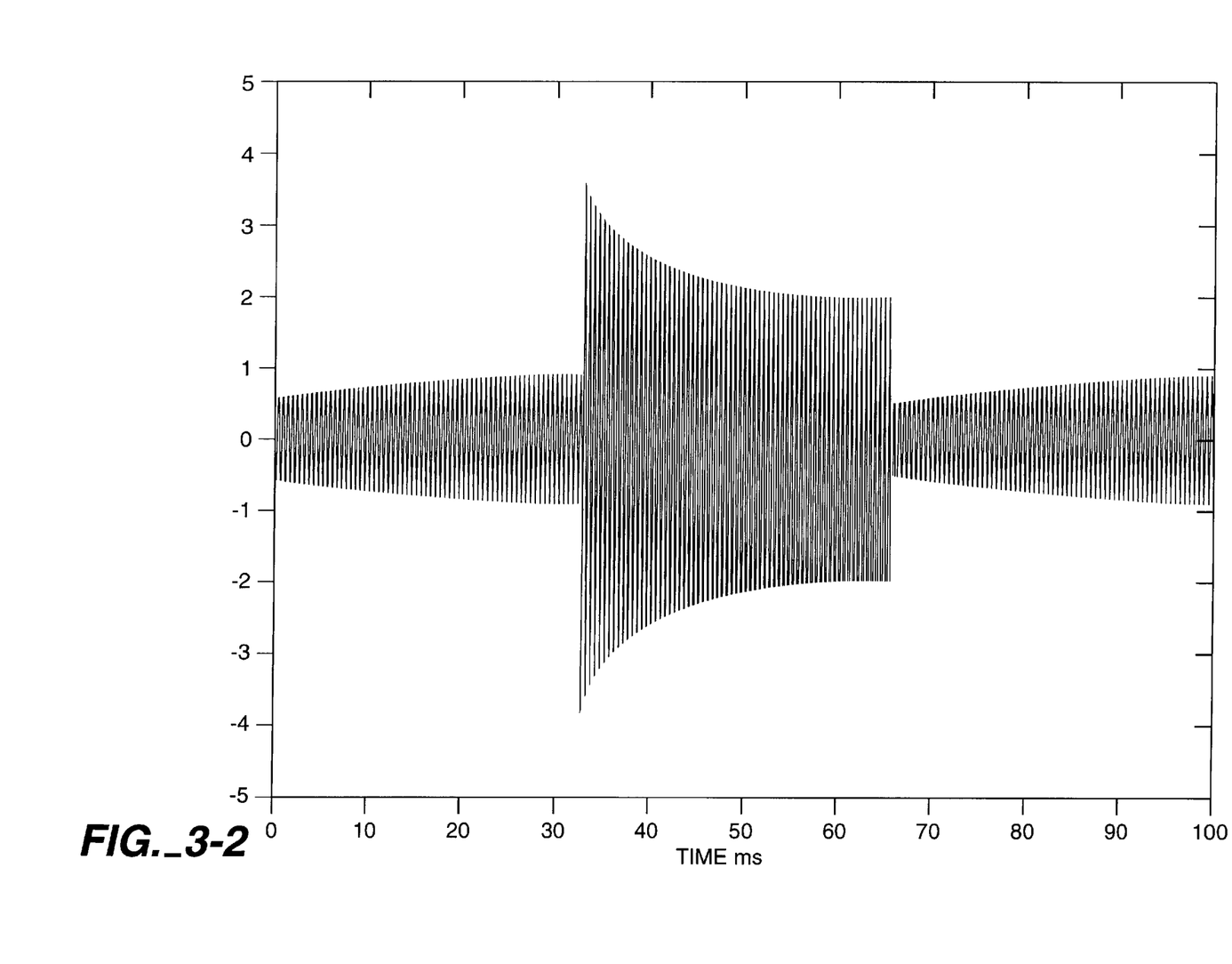

A simulation of a compressor and expandor using these novel algorithms was developed using a Matlab® program. The simulation was exercised using the 12 dB step described in CCITT §162, and the band width of the averaging loop adjusted to satisfy the attack and recovery times in EIA/TIA-553 Compatibility Specification. FIG. 3-1 illustrates the test signal(12 db step) specified by CCITT §162. FIG. 3-2 illustrates the output of the compressor utilizing the DSP algorithm described by equations 4, 5, and 6. The value of k=0.003 is chosen to meet the attack time specified by CCITT 162. The same 'k' value is appropriate for the recovery time specification.

Figure 41:
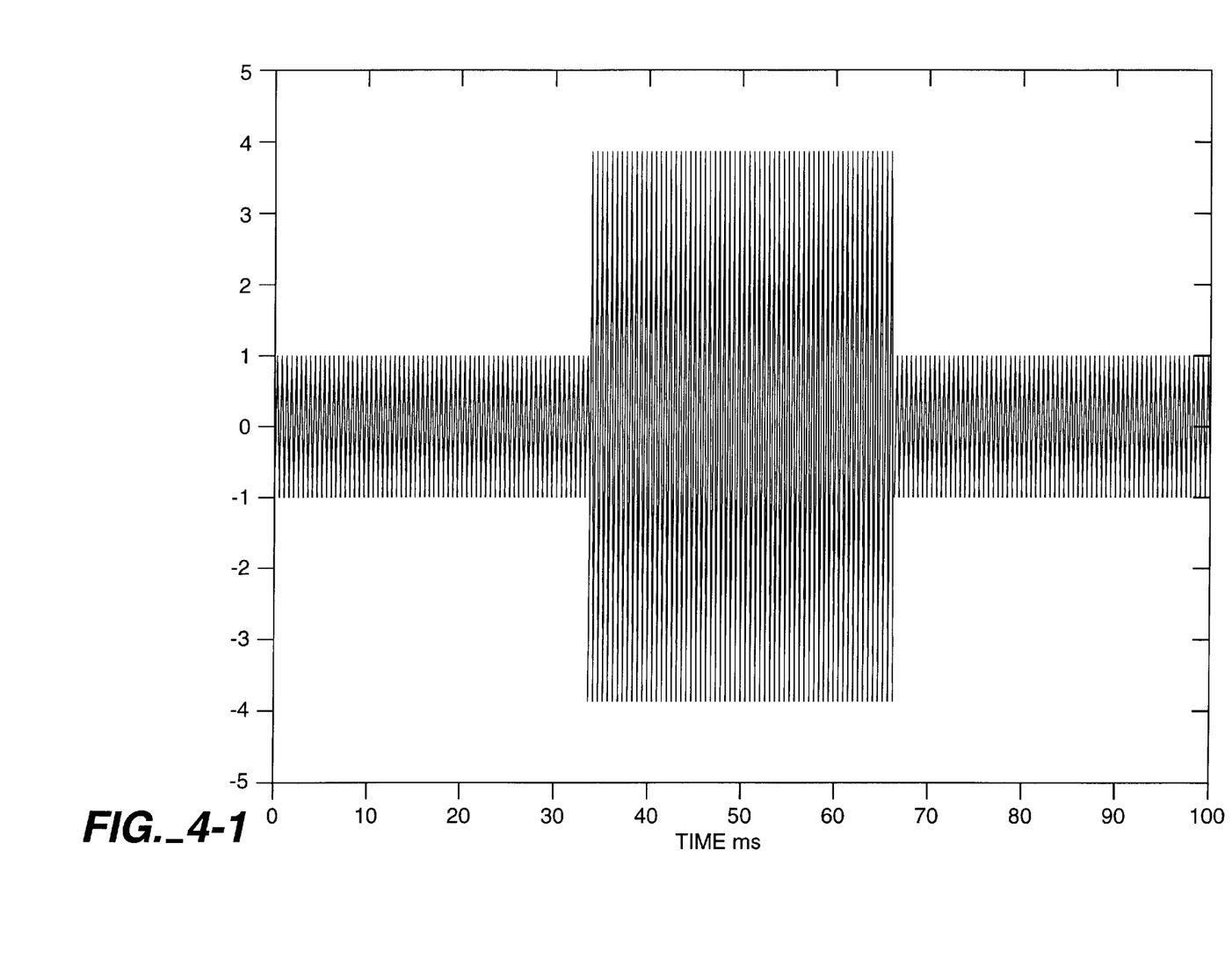
Figure 42:
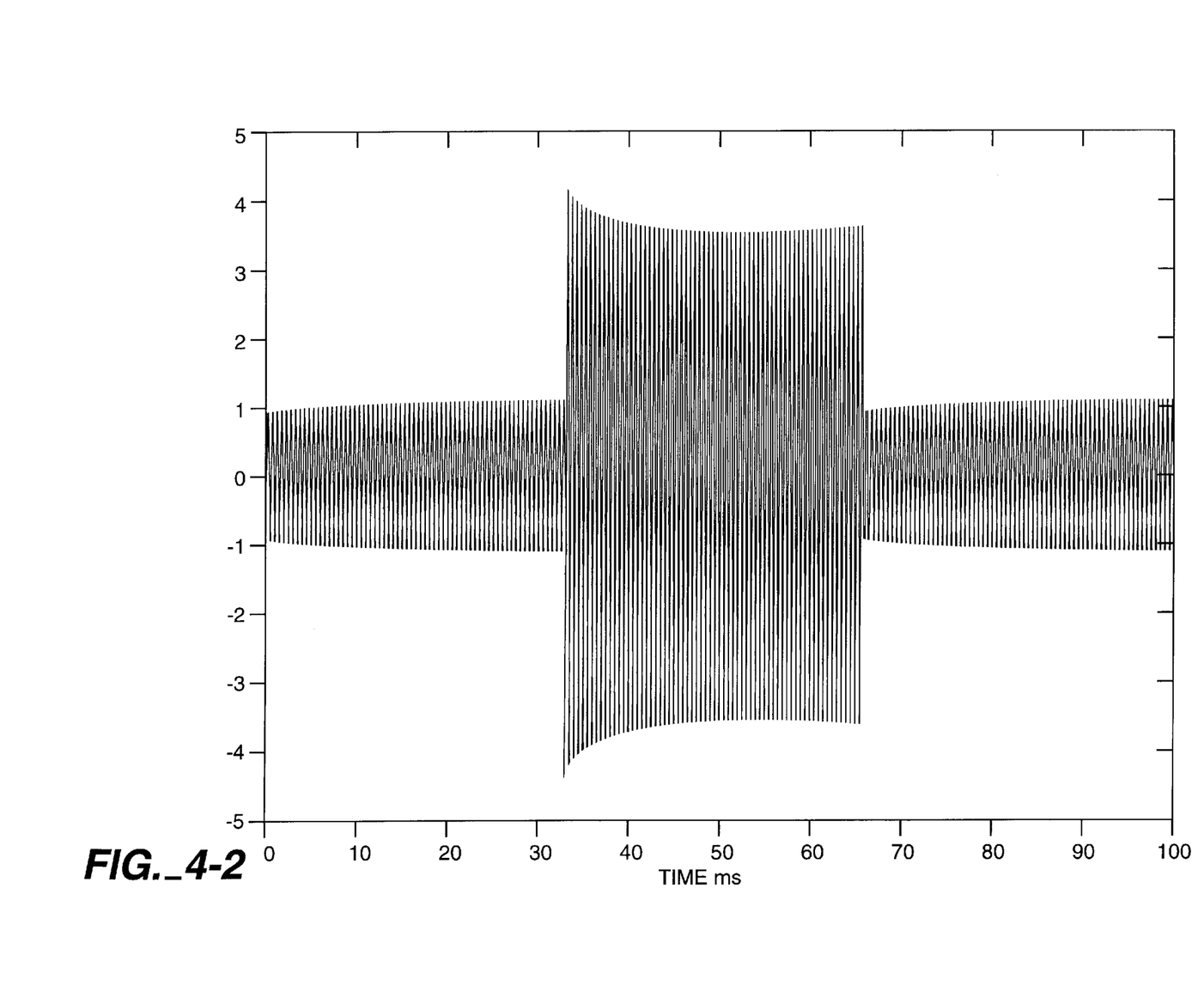

In an end-to-end system, the input signal passed through a compressor in the transmitting device, and an expandor in the receiving device. If these two stages are perfectly matched, then the input signal is perfectly replicated at the output of the expandor, as shown in FIG. 4-1, where a compressor/expandor pair with identical 'k' values have been used. If however the compressor/expandor pair is not perfectly matched, then the output signal will be distorted, as is shown by FIG. 4-2, in which the 'k' values are not well matched. This is often the case in "hardware" compandors since the compressor and expandor attack and decay times are set with tantalum or electrolytic capacitors, which have a wide tolerance on their value. This invention however does not suffer from such restrictive hardware. By implementing the expansion and compression functions according to the algorithms of this invention 'k' can be easily adjusted to insure a perfect match. Also 'k' could be easily optimized for different cellular networks.

This distortion is non-linear, and so it is difficult for a conventional baseband modem (e.g. V.32bis) receiving data from an imperfect compandor to resolve. Adaptive equalization is used to compensate for channel distortions, but it is designed to overcome distortion due to linear effects. By applying the companding in a DSP, the distortion due to the compressor/expandor pair may be removed. In an alternative embodiment, companding functions could be removed altogether as they are not required for modem communications. However this would need to be done at both ends. Therefore a distinctive calling tone could be used to identify when both sides of the cellular link support this particular optimization. Tests using this method have demonstrated data communications at speeds up to 19.2 kbps (V.32 terbo). Using the V.34 protocol should enable even higher communication rates.

The corresponding cellular function can be implemented within the DSP or software. It requires the application of a gain function (multiply) at the sample rate, and averaging and gain adjustment at a rate sufficient to avoid aliasing of the baseband signal. In the preferred embodiment of this invention, 15–20 kHz is suggested.

The implementation of this invention in DSP can be integrated with existing V.32bis or V.34 code by intercepting the sample stream to and from the Codec and applying the above disclosed processing. Similarly, the muting, deviation limiting and pre/de-emphasis could be applied in the same manner.

The results of creating an integrated cellular switched modem are significant. By combining the modem and radio end to end and using a reduced level of pre-emphasis, no de-emphasis filtering, and implementing the companding functions in DSP, undesirable pieces of baseband processing required by previous IC systems are eliminated. This results in an enhanced performance not duplicated in traditional modems implemented using separate baseband modems and cellular phones. Data communication is faster and more reliable. Through use of this invention, consistent V.32bis data rates of 9600 bps to 14400 bps are achieved. Limitations on the data rate are imposed by similar distortions that occur in the base station transmitting equipment. However, if the methods detailed in this disclosure are implemented at both sides of the cellular modem link, reliable communication at 16800 bps (a V.32terbo data rate) has been demonstrated. Similarly, this invention can be applied equally well to the higher data rate V.34 modem protocol.

Furthermore, because all of the baseband processing is implemented in a single DSP processor that is used for the modem, there is a significant reduction in the number of parts required for the cellular modem. This translates into a significantly cheaper system.

A final embodiment of this invention contemplates system solutions which are optimized for different cellular network configurations. In this embodiment, with the cooperation of cellular operators and manufacturers of the base stations and modems, matching software would be placed in the base stations of the network. Then, when a base station receives a transmission, it could ask, (e.g. based on a handshake between the base station and the modem) the transmitting modem if it was an integrated modem according to this invention. If the answer was yes, then it would perform the complementary processing in the base station. This would significantly improve end to end data communications performance over the cellular network. It should be noted that even if the base station did not have the matching complementary software, a modem according to this invention would still be able to transmit and receive data at an equivalent, if not better, rate than present hardware based baseband modems.

The present invention has been described by way of example, and modifications and variations of the exemplary embodiments will suggest themselves to skilled artisans in this field. The scope of the invention is to be measured by the appended claims and equivalents thereof.

I claim:

1. An integrated cellular switched modem for enhanced data communication comprising:

data source;

a receiver for receiving incoming data;

a programmed digital processor reading signals from the data source and the receiver for baseband processing of said signals; and a transmitter for transmitting said processed baseband signals, wherein said baseband processing implements a companding function on said data signal, wherein said companding function includes an expandor, whereby a variable gain proportional to the average input signal power is applied to the input signal and the expandor implements the following algorithm:

(a) sig_out(n)=gain(n)*sig_in(n)
   (b) sig_avg(n+1)=k*abs(sig_in(n))+(1−k)*sig_avg(n)
   (c) gain(n+1)=sig_avg(n+1)/sig_ref . . . sig_ref
      where k is an averaging constant and sig-ref is the reference signal amplitude.

2. An integrated modem according to claim 1, wherein the attack and recovery times are adjusted by modifying k.

3. An integrated cellular switched modem for enhanced data communication comprising:

a data source;

a receiver for receiving incoming data;

a programmed digital processor reading signals from the data source and the receiver for baseband processing of said signals; and a transmitter for transmitting said processed baseband signals, wherein said baseband processing implements a companding function on said data signal, wherein said companding function includes a compressor whereby a variable gain proportional to the inverse average output signal strength is applied to the input signal and the compressor implements the following algorithm:

(d) sig_out(n)=sig_in(n)/gain(n)
(e) sig_avg(n+1)=k*abs(sig_out(n))+(1−k)*sig_avg(n)
(f) gain(n+1)=sig_avg(n+1)/sig_ref k is averaging constant and sig_ref is the reference signal amplitude.

4. An integrated modem according to claim 3, wherein the attack and recovery times are adjusted by modifying k.

5. A method for enhanced data communications in a cellular wireless modem comprising the steps of:

inputting data signals from a data source;

receiving incoming data;

performing baseband processing by implementing a companding function on the data signals and incoming data by said modem; and transmitting said processed data signals, wherein the step of processing further comprises the step of:

expanding the data signals, wherein a variable gain proportional to the average input signal power is applied to the input signal and the step of expanding is implemented by the algorithm:

(a) sig_out(n)=gain(n)*sig_in(n)
(b) sig_avg(n+1)=k*abs(sig_in(n))+(1−k)*sig_avg(n)
(c) gain(n+1)=sig_avg(n+1)/sig_ref ... sig_ref where k is an averaging constant and sig-ref is the reference signal amplitude.

6. A method for enhanced data communications in a cellular wireless modem comprising the steps of:

inputting data signals from a data source;

receiving incoming data;

performing baseband processing by implementing a companding function on the data signals and incoming data by said modem; and transmitting said processed data signals, wherein the step of processing further comprises the step of:

compressing the data signals, wherein a variable gain proportional to the inverse average output signal strength is applied to the input signal and the step of compressing is implemented by the algorithm:

(d) sig_out(n)=sig_in(n)/gain(n)
(e) sig_avg(n+1)=k*abs(sig_out(n))+(1−k)*sig_avg(n)
(f) gain(n+1)=sig_avg(n+1)/sig_ref k is averaging constant and sig_ref is the reference signal amplitude.

* * * * *